LE GRAND G. CAREY.
TRUCK.
APPLICATION FILED MAR. 26, 1915.
1,228,179.
Patented May 29, 1917.
2 SHEETS—SHEET 2.
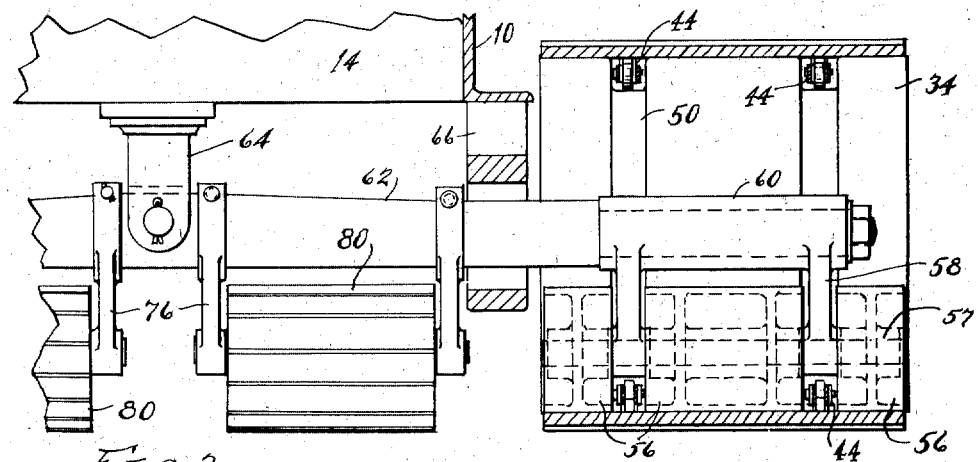
FIG. 3.
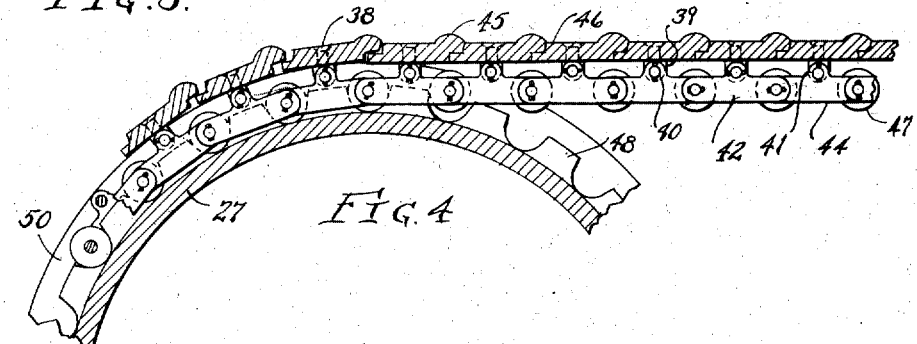
FIG. 4.
FIG. 6.
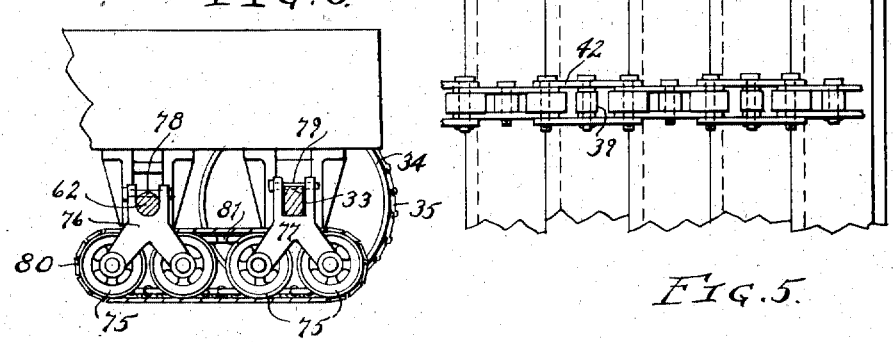
FIG. 5.
WITNESSES:
Justin W Macklin
Gertrude N. Smith
INVENTOR:
Le Grand G. Carey,
BY Albert H. Baker,
ATTY

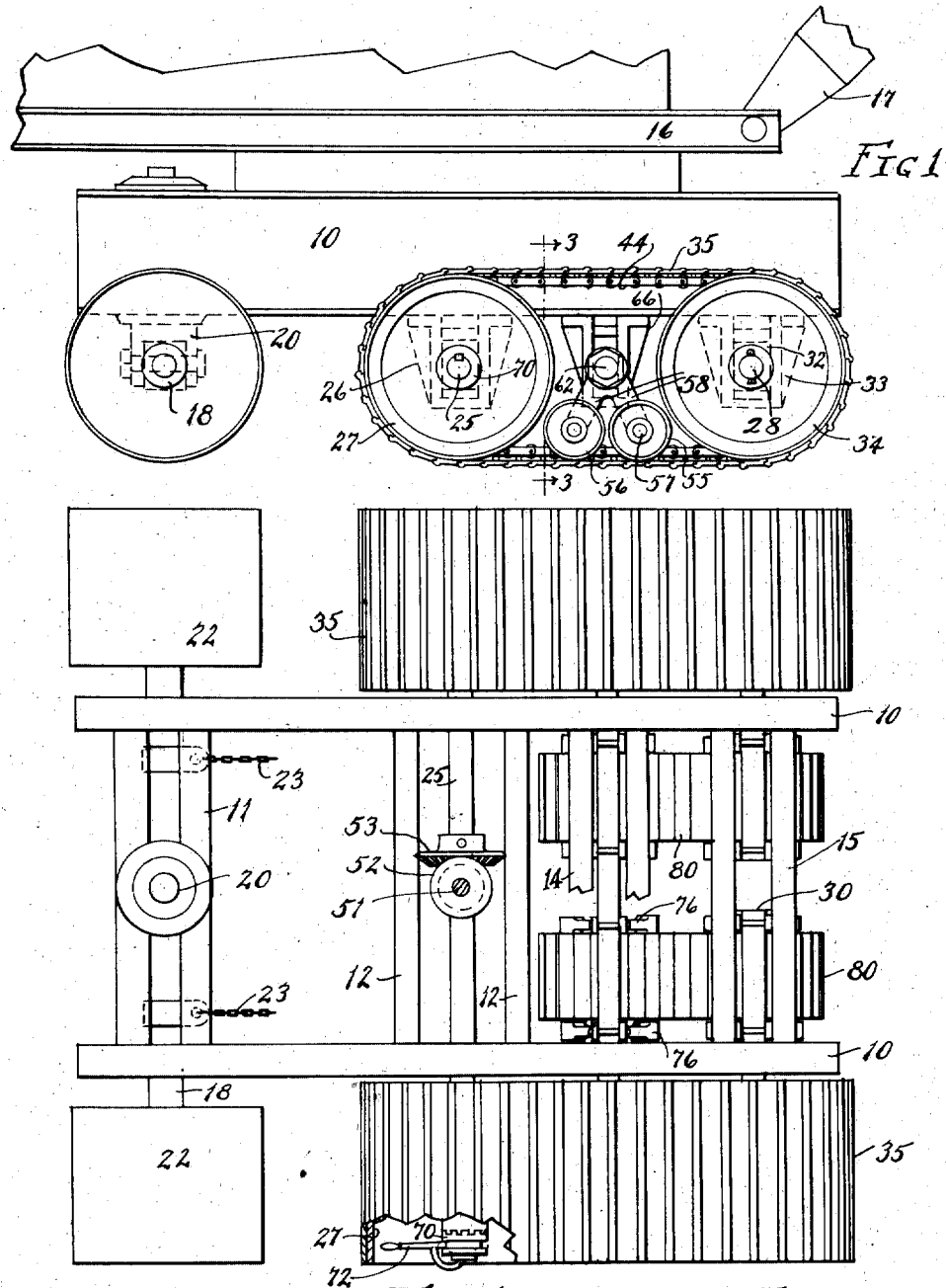

UNITED STATES PATENT OFFICE.

LE GRAND G. CAREY, OF CLEVELAND, OHIO, ASSIGNOR TO EDWIN D. CAREY, OF BEDFORD, OHIO.

TRUCK.

1,228,179. Specification of Letters Patent. Patented May 29, 1917.

Application filed March 26, 1915. Serial No. 17,107.

*To all whom it may concern:*

Be it known that I, LE GRAND G. CAREY, a citizen of the United States, residing at Cleveland, in the county of Cuyahoga and State of Ohio, have invented a certain new and useful Improvement in Trucks, of which the following is a full, clear, and exact description, reference being had to the accompanying drawings.

This invention relates to trucks particularly adapted for self-propelled vehicles of a type carrying hoisting mechanism, steam shovels, and the like, and the general object of the invention is to provide a simple efficient traction apron and a simple structure coöperating therewith for supporting and propelling the vehicle. A more specific object is to arrange the traction apron to provide a large traction surface with mechanism for most efficiently using this surface in supporting the truck, while allowing the traction aprons to conform to irregularities of the roadway or ground. Another object is to arrange for conveniently steering and turning the truck. Other features of my invention will become apparent in the following description, which refers to the drawings, and the essential characteristics are hereinafter set forth in the claims.

In the drawings, Figure 1 is a side elevation of my truck showing a portion of a superstructure forming the part of the hoisting mechanism; Fig. 2 is a sectional plan of the truck with the superstructure removed; Fig. 3 a vertical transverse section on an enlarged scale, through the traction apron and showing the means for holding the lower reach of the traction apron in contact with the ground, the section being taken substantially on the line 3—3 of Fig. 1; Fig. 4 is a vertical section through a portion of the traction apron and one of the wheels over which it runs, the section being taken on a plane extending longitudinally of the apron and shown on a larger scale than Fig. 3; Fig. 5 is a plan of a portion of the traction apron on the same scale as Fig. 4, and showing one of the chains forming a part of the same; Fig. 6 is a vertical longitudinal section showing one of the smaller intermediate traction aprons.

Referring to the drawings by reference numerals, 10 indicates longitudinal members of the truck frame connected by cross braces 11, 12, 14 and 15. 16 indicates the rotatable frame of a superstructure and 17 a portion of a boom carried by the same, being illustrative of any suitable mechanism which may be mounted on my truck. A rear axle 18 is intermediately pivoted to a swivel member 20 and provided with wheels 22 at each end, which may be swung about the swivel for steering the machine by chains 23, connected with the axle and extending to a suitable steering mechanism not shown.

Intermediate of the ends of the longitudinal members 10, is a transversely extending axle 25, carried in rigid bearings 26, depending from the frame members 10 and having its ends extending outwardly at each side of the frame member to receive the wheels 27, which are rotatably mounted thereon. A third axle 28 adjacent the forward end of the frame is intermediately pivoted in a block 30, carried by the cross members 15, and its ends extend through blocks 32, which have a limited vertical movement in bearing brackets 33, depending from the frame members 10. On the ends of this axle are rotatably mounted wheels 34, corresponding to the wheels 27.

The wheels 27 and 34 are shown as wider than the steering wheels 22, their inner edges extending inwardly substantially to the frame members, and these wheels are adapted to receive the traction aprons 35.

The traction aprons are composed of a series of transverse flights 38, each having inwardly projecting lugs 39, rigidly mounted on their inner side a distance in from the ends and substantially intermediate of the sides of the flights. These lugs are adapted to receive pivot pins 40 carried on upwardly extending ears 41 of links 42, of sprocket chains 44. Each flight of the traction apron is shown as having beaded portions 45 overlapping a cut-away portion 46 on the next adjacent flight into which it fits when the apron is drawn straight. There are preferably two of the chains 44 for each traction apron, secured to the aprons adjacent the ends of the flights, as described, and adapted to run in grooves 50 in the periphery of the wheels 27 and 34. The wheels 27 are provided with rigid sprocket teeth 48 extending upwardly from the bottom of the grooves 50 and adapted to engage rollers 47 provided at each joint of the sprocket chains, for driving the traction aprons to propel the truck when the intermediate axle 25 is rotated. This axle may be driven by a vertical shaft 51, extending downwardly from the superstructure and having a bevel pinion 52 meshing with a bevel gear 53 rigid on the axle 25. It will be seen that as the wheels 27 are rotated the sprocket teeth 48 engaging the chains of the traction aprons will cause the aprons to revolve, thereby driving the truck.

To hold the lower reach of the traction aprons intermediate of the wheels 27 and 34, in contact with the ground and thereby support a portion of the weight of the truck, I have provided two sets of wheels 55 and 56, bearing against the upper side of this lower reach and mounted in shafts 57 rigidly carried by arms 58 extending downwardly from a hub member 60. There are two sets of these wheels for each traction apron, and the hub members 60 of the frames for holding these wheels in place are pivotally mounted on the ends of a fourth axle 62, pivoted at its center in a block 64, secured to the cross members 14 of the frame. The ends of this axle are vertically slidable in bearing brackets 66 depending from the frame members 10, allowing only a slight vertical movement of each end of this axle, to compensate for unevenness of the roadway tending to push up the intermediate portion of the lower reach of the traction apron.

It will be noted that the wheels 55 and 56 are so arranged on their shafts as to straddle the chains 44 and these wheels are movable about the axle, allowing one to rise slightly as the other goes down. As the lower reach of the traction apron is capable of only a limited upward movement, these wheels are preferably made as large as can be arranged between the wheels 27 and 34, and still allow a clearance providing for a slight swinging movement about the axle 62. The wheels 27 are normally driven by the axle 25, through clutch members 70 at each end of the axle, and slidably keyed thereto so that either clutch may engage the corresponding wheel 27 to drive it independently of the other when it is desired to turn the machine sharply. In Fig. 2 I have shown a removable lever 72 adapted to engage a groove in the clutch member and the end of the axle for operating the clutch. These clutch members may be arranged in a manner to be controlled from a position on the truck, if desired.

When the machine is to be used on very soft ground for example when the truck is carrying a shovel which is operating in sand or soft earth, it is necessary to provide as large supporting surface as is possible. Under such conditions I prefer to add to the supporting surface of the large traction aprons already described, smaller additional traction aprons between the large traction aprons and beneath the truck. As shown there are provided two alined sets of four wheels each, shown at 75, and arranged in pairs and mounted on shafts carried in A-frames 76 and 77, which extend upwardly and have bifurcated portions loosely embracing the axles 62 and 33, being held in position by pins 78 and 79, extending through these bifurcated portions and engaging notches in the upper sides of the axles. These wheels are constructed similarly to the larger wheels 27 and 34, and traction aprons 80 running on the same are composed of a series of flights connected by chains 81. It is not necessary to provide any driving action on these wheels and accordingly there are no beads on the flights and no sprockets in the wheels for engaging the chains. It will be noted that the forward wheels 75 project outwardly a considerable distance past the point of contact of the wheels 34, bringing additional supporting surface to the points where it is most needed.

Having thus described my invention, what I claim is:

1. In a device of the character described, the combination of a truck frame, transverse axles therefor, wheels on the ends of said axles, said wheels having peripheral grooves, and traction aprons running over said wheels and comprising a continuous series of flights attached together by chains adapted to run in said grooves.

2. In a device of the character described, the combination of a truck frame, a pair of transverse axles therefor extending outwardly past the frame, wide wheels on the ends of the axles, each having a plurality of peripheral grooves, traction aprons adapted to run on said wheels and comprising a series of flights secured together by chains, said chains being adapted to run in said grooves, and sprocket teeth in the wheels of one of said axles adapted to engage the chain for driving the traction apron.

3. The combination with a truck frame, of a pair of transverse axles, traction wheels on said axles, endless traction aprons adapted to run on said wheels, smaller wheels between the larger wheels, axles adapted to hold them in contact with the lower reach of the traction apron, and a swinging member carrying said last named axles.

4. The combination with a truck frame, of a pair of transverse axles, traction wheels on said axles, endless traction aprons adapted to run on said wheels, smaller wheels between the larger wheels, axles therefor adapted to hold these wheels in contact with the lower reach of the traction apron, and means carrying said last named wheels and adapted to allow a limited movement of the axis thereof.

5. The combination with a truck frame, of a pair of transverse axles, weight supporting wheels on the outer ends of the same, traction aprons adapted to run over the alined wheels on the last mentioned axles, a transverse member between the last mentioned axles, depending frames pivoted to swing on said member, and a series of wheels carried by said frames adapted to contact with the lower reach of the traction apron to hold the same in contact with the ground.

6. The combination with a truck frame, of a steering axle and wheels thereon, a pair of transverse axles, broad weight supporting traction wheels on the outer ends of the same, traction aprons adapted to run over the alined wheels on the last mentioned axles, a transverse axle member between the last mentioned axles and having vertically movable ends, depending frames pivoted on its ends, and wheels adapted to contact with the lower reach of the traction apron and arranged at each side of and below the last named axle.

7. The combination with a truck frame, of a pair of separated transverse weight supporting axles having wheels at their outer ends, endless traction aprons adapted to run over alined wheels on the axles and comprising flights having an inwardly projecting flexible connection, alined smaller wheels between the larger wheels and adapted to hold the intermediate portions of the aprons in contact with the ground, and movable frames carrying said last mentioned wheels and permitting them to straddle the flexible connections.

8. The combination with a truck frame, of a pair of separated transverse axles having broad wheels at their outer ends outside the frame, endless traction aprons adapted to run on said wheels, wheels carried beneath the truck frame between the larger wheels and laterally separated therefrom, and a separate traction apron adapted to run thereon and contact with the ground.

9. The combination, with a truck frame, of a pair of separated transverse axles having broad wheels at their outer ends outside the frame, endless traction aprons adapted to run on said wheels, pairs of alined smaller wheels between said aprons, pivoted frames carrying the alined wheels, and traction aprons running over said wheels and adapted to contact with the ground.

10. The combination, with a truck frame, transverse axles and broad wheels outside of the frame, of traction aprons adapted to run on said broad wheels, pairs of rotary members beneath the truck frame between and adjacent to each of the traction aprons, and additional traction aprons adapted to run over said rotary members.

11. The combination, with a truck frame, transverse axles and broad wheels outside of the frame, of traction aprons adapted to run on said broad wheels, a pair of rotary members beneath the truck frame between the traction aprons, a bracket carrying said rotary members so positioned that one of the rotary members projects longitudinally beyond the axle of one pair of the broad wheels, an alined rotary member depending beneath the truck, and a traction apron adapted to run over said rotary member.

12. The combination, with a truck frame, of a steering axle therefor at one end, wheels on the steering axle, a transverse axle at the other end pivoted at the center to allow a vertical movement of the ends, means preventing longitudinal movement of the ends, a rigid intermediate axle, broad wheels on the ends of the two last mentioned axles, traction aprons adapted to run on the last mentioned wheels, and means for holding the traction aprons in contact with the ground between these wheels, said last named means having a movement to allow for unevenness in the ground.

13. The combination, with a truck frame, of transverse axles and wheels therefor mounted on opposite ends of the axles, peripheral grooves in each of the wheels, traction aprons running over said wheels and comprising a series of overlapping beaded flights, chains running in said grooves, and means for pivoting each of the flights to said chains.

14. In a device of the character described, the combination of a truck frame, a steering axle therefor at one end, wheels on the ends of the steering axle, an axle at the opposite end rigidly mounted with relation to its transverse movement, a rigid intermediate axle, means for driving the last mentioned axle, wheels on the ends of the two last named axles, traction aprons running over said wheels, means on the traction aprons engaging the intermediate wheels for driving the aprons, and clutch members for clutching the wheels of the intermediate axle with said axle independently of each other.

15. The combination with a truck frame, a pair of separated transverse axles, broad wheels at the ends of said axles, means for driving one of said axles, traction aprons adapted to run on the last mentioned wheels, said wheels having grooves in their periphery and said traction aprons having inwardly projecting flexibly connected members engaging said grooves in such a manner as to be driven by the driving wheels, and means controlling the driving means whereby one of said traction aprons may be driven independently of the other.

In testimony whereof, I hereunto affix my signature in the presence of two witnesses.

LE GRAND G. CAREY.

Witnesses:
JUSTIN W. MACKLIN,
ALBERT H. BATES.

Copies of this patent may be obtained for five cents each, by addressing the "Commissioner of Patents, Washington, D. C."